US010356087B1

(12) United States Patent
Vetter et al.

(10) Patent No.: US 10,356,087 B1
(45) Date of Patent: Jul. 16, 2019

(54) SYSTEM, METHOD AND COMPUTER PROGRAM PRODUCT FOR CREDENTIAL PROVISIONING IN A MOBILE DEVICE PLATFORM

(71) Applicant: Intelligent Waves LLC, Reston, VA (US)

(72) Inventors: Brian J. Vetter, Austin, TX (US); Mohammad Salman Dhedhi, Round Rock, TX (US)

(73) Assignee: INTELLIGENT WAVES LLC, Reston, VA (US)

( * ) Notice: Subject to any disclaimer, the term of this patent is extended or adjusted under 35 U.S.C. 154(b) by 108 days.

(21) Appl. No.: 15/685,814

(22) Filed: Aug. 24, 2017

Related U.S. Application Data

(60) Provisional application No. 62/380,008, filed on Aug. 26, 2016.

(51) Int. Cl.
*H04L 9/30* (2006.01)
*G06F 21/31* (2013.01)
*H04L 29/06* (2006.01)

(52) U.S. Cl.
CPC ............ *H04L 63/0838* (2013.01); *H04L 9/30* (2013.01); *H04L 63/067* (2013.01); *H04L 63/0853* (2013.01); *G06F 21/31* (2013.01)

(58) Field of Classification Search
CPC ..... H04L 63/0838; H04L 9/30; H04L 63/067; H04L 63/0853; H04W 12/06; G06F 21/31
See application file for complete search history.

(56) References Cited

U.S. PATENT DOCUMENTS

| 9,667,703 | B1 | 5/2017 | Vetter et al. | |
| 2016/0285628 | A1* | 9/2016 | Carrer | H04L 9/3228 |
| 2016/0335823 | A1* | 11/2016 | Shin | G06Q 50/26 |

* cited by examiner

*Primary Examiner* — Techane Gergiso
(74) *Attorney, Agent, or Firm* — Pillsbury Winthrop Shaw Pittman, LLP

(57) ABSTRACT

To provision a client application on a client device, a user may be provided with a QR code, a one-time password, or a manual entry page for starting a credential provisioning process via a credential provisioning service provided by a credential provisioning server in a secure network. The client application may include information on trusted servers operating in the secure network. The credential provisioning server may operate to perform a sequence of actions to verify user credentials and determine, based on rules applicable to the user, the client device, or a combination thereof, whether the client application is to be provisioned on a client device. If so, the credential provisioning server may operate to generate a key pair, obtain a signed certificate, encrypt them, and send them to the client device such that the client application can use them to establish a mutual secure connection with a trusted server.

20 Claims, 8 Drawing Sheets

SYSTEM, METHOD AND COMPUTER PROGRAM PRODUCT FOR CREDENTIAL PROVISIONING IN A MOBILE DEVICE PLATFORM

CROSS-REFERENCE TO RELATED APPLICATION(S)

This is a conversion of, and claims a benefit of priority from U.S. Provisional Application No. 62/380,008, filed Aug. 26, 2016, entitled "SYSTEM, METHOD AND COMPUTER PROGRAM PRODUCT FOR CREDENTIAL PROVISIONING IN A MOBILE DEVICE PLATFORM," the entire disclosure of which is fully incorporated by reference herein, including the appendices.

TECHNICAL FIELD

This disclosure relates generally to provisioning of credentials associated with the public-key infrastructure (PKI). In particular, this disclosure relates to the provisioning of credentials to a client on a mobile device utilized with a mobile device platform. More specifically, embodiments disclosed herein relate to the provisioning of client credentials for a client application on a mobile device utilized in a virtual mobile device environment.

BACKGROUND OF THE RELATED ART

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives— still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY OF THE INVENTION

Embodiments as disclosed herein provide a system, method, and computer program product for credential provisioning for applications on mobile devices in a secure environment. In this disclosure, "provisioning" may refer to a one-time set up function or process for a user or organization. While embodiments as disclosed herein may have general applicability with respect to types of client applications on mobile device, in certain embodiments, the client applications provisioned with these credentials may be utilized for securely generating remote views using a virtual mobile device platform.

In some embodiments, it may be desired to perform a credential provisioning process that provisions an account for a client application running on a client device such that the client application can access the certain network resources of a computer network environment (e.g., resources of the virtual mobile device platform). For example, a user may, by invitation or on their own, initiate a "create account" process within an application that the user has downloaded on their mobile device. Alternatively, the application may start a provisioning process to create an account for the user on initial use of the application on the user's mobile device (which, in this example, can represent a client device of the virtual mobile device platform). Responsive to a request from the client device, a server computer (e.g., of the virtual mobile device platform) may operate to verify a user identifier contained in the request against a user entry previously created and stored at the server side. The request from the client device may include a temporary password (e.g., a one-time password) for the user, a device type, and device operating system (OS) information. The user entry, which may be associated with a particular user, includes a one-time password stored at the server side for the particular user.

If the user entry is not found, an error message is returned to the application executing on the client device and the credential provisioning process ends. If the user entry is found, the one-time password contained in the request from the client device is compared against the one-time password retrieved locally by the server computer. In some cases, further authentication may be needed. For example, if enterprise authentication is required, the server computer may prompt the user to provide their username and password for their enterprise account (referred to herein as "enterprise credentials"). The server computer may utilize an authentication service or directory service to verify the user's enterprise credentials. If the one-time password contained in the request from the client device and the one-time password retrieved locally by the server computer do not match, or if the user cannot be verified using the user's enterprise credentials, the server computer may generate an error message and return the error message in response to the request to provision an account for the client application on the client device. When enterprise authentication is not required, the client application generates a temporary encryption password and provides it to the server computer. This temporary encryption password is not used for authentication, but is used by the server computer to encrypt the credentials that are delivered to the client application as a result of a successful provisioning request to the server computer.

If the user can be authenticated, the server computer may operate to access a rules database and, based on at least one rule applicable to the user, the device type, an OS type, or an OS version, determine whether the credential provisioning process may proceed. For example, in some embodiments, a "blacklist" approach may be implemented such that if the client device is of a particular device type, OS type, or OS version that is not supported by the server computer that performs the credential provisioning process, the credential provisioning process may be terminated. In some embodiments, a "whitelist" approach may be implemented such that if the client device is of a particular device type, OS type, or OS version that is determined by the server computer as suitable for the credential provisioning process, the credential provisioning process may proceed.

When the server computer determines, based on any applicable rules from the rules database, that the credential provisioning process may proceed, the server computer may determine credential parameters and generate a public and private key pair using the credential parameters (e.g., data associated with the user's enterprise account). Using the user's enterprise account information and the key pair thus generated, the server computer may operate to generate a certificate signing request and communicate same to a certificate authority. In return, the certificate authority may send a signed certificate to the server computer. The server computer can generate a certificate file that contains the signed certificate and the key pair. The certificate file can be encrypted using the temporary encryption password (which is generated by the client application) contained in the request from the client device or the user's enterprise password (which is provided by the user). The server computer may return the encrypted certificate file to the client device, with an instruction as to where the signed certificate and the key pair should be stored on the client device. This completes the credential provisioning process and the client application is ready to connect to, for example, an application server running on the virtual device platform.

In some embodiments, the key pair may be generated on the client device such that a generated key is never exposed anywhere but on the client device itself. In such cases, in response to a request (which may contain a one-time password) from the client device to create an account for the client application, the server computer may provide credential data associated with the user (e.g., a user name and email address from the user's enterprise account) and instruct the client device to generate the keys and a certificate signing request. The client device generates the keys, stores the keys at a designated location on the client device, generates the certificate signing request on the client device using the keys and the provided credential data, and sends the certificate signing request to the server computer. The certificate signing request itself may be signed using the generated private key. The certificate signing request may contain a one-time password which can be used for verification purposes. The server computer verifies the certificate signing request (e.g., by comparing the one-time password contained in the certificate signing request and the one-time password stored at the server side or by using a public key that is paired to the generated private key used to sign the certificate signing request itself). If the certificate signing request is verified, the server computer sends it to a certificate authority and returns a signed certificate from the certificate authority to the client device. The signed certificate is stored along with the client-generated keys at the designated location (e.g., in a keystore/keychain) on the client device. The client device can then use the signed certificate to establish a mutual secure connection with a trusted server. If the certificate signing request is not verified, the credential provisioning process is terminated and no account is provisioned for the client application on the client device.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
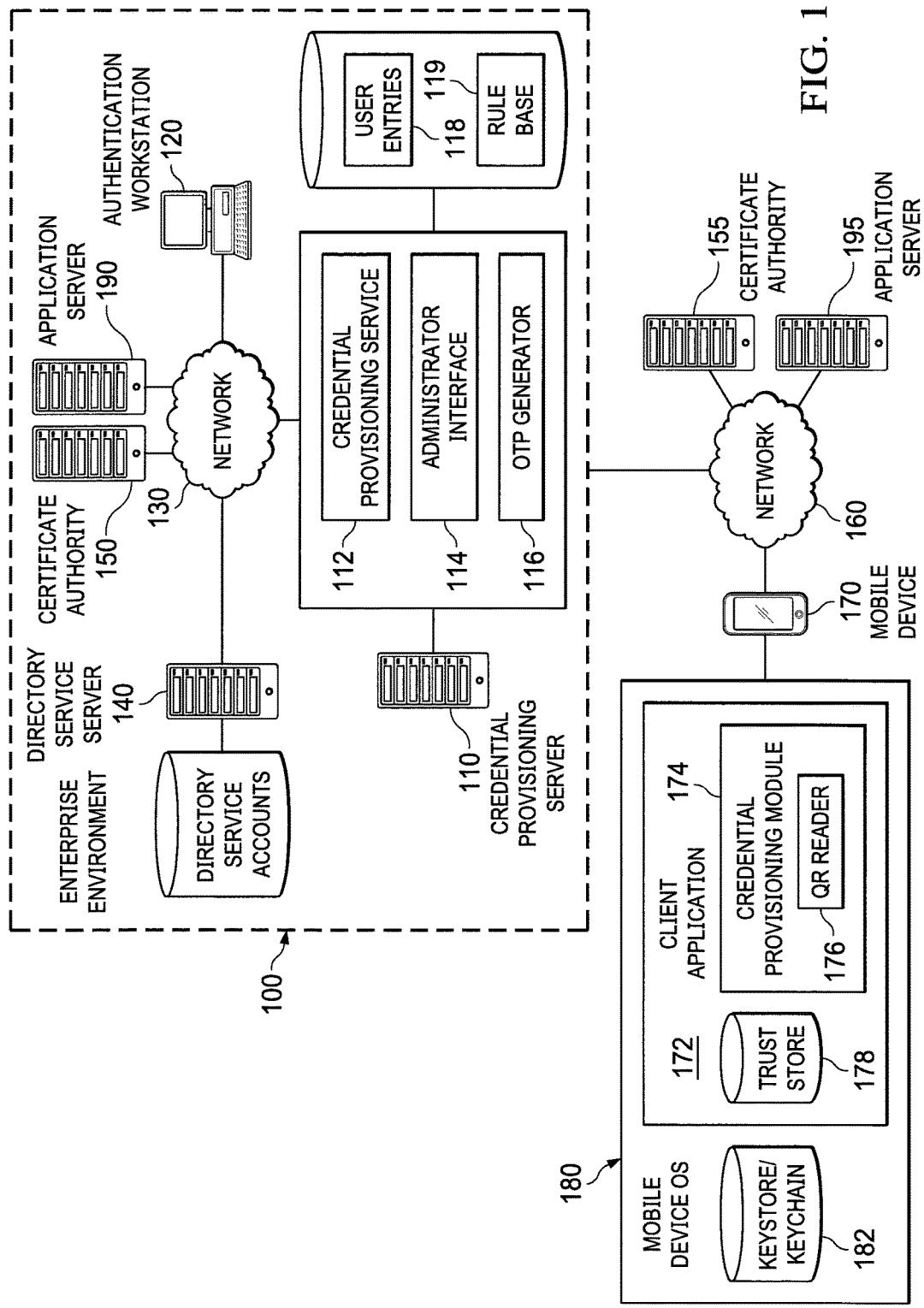
FIG. 1 depicts a diagrammatic representation of an example of a network environment in which embodiments disclosed herein can be implemented.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, modern mobile devices are frequently used to execute applications that connect to network-based servers to support many desired tasks shared by the mobile application and the server. This communication is frequently protected by encrypted communications protocols using public key cryptography (e.g., server-side public key cryptography). In many cases, the use of public key cryptography can be easily hacked using man-in-the-middle (MiTM) attacks as most services utilize host-based trust only. Public key infrastructure (PKI) also supports client-based trust through the use of client credentials (using public and private keys), such as by use of mutual authentication in Transport Layer Security (TLS), known as mTLS, or other protocols. However, very few mobile applications support client credentials because they are very difficult to deploy.

Specifically, the provisioning of client credentials for use in authentication between two computing systems over a network has typically been performed by system administrators. Some use manual processes that require connecting directly to the client device (whether it be a mobile device or a personal computer) and storing the credentials directly onto the computing device. For example, when client credentials are used in technologies such as virtual private networks (VPNs), they are typically installed on a device using management tools or require a physical connection to a computer (e.g. USB cable a between mobile device and personal computer). Some administrators use management tools for a particular type of computing device (e.g., a Windows machine) to create a client credential for use by the user and any applications on the device. In some cases, for certain computing devices like routers (e.g. computing appliances), a protocol called Simple Certificate Enrollment Protocols (SCEP) may be used for a device to provision its keys from a server. Certain entities (e.g., companies, Information Technology (IT) departments, etc.) may also provide a mechanism for a web browser to provision keys and certificates using an enrollment server that communicates with a certificate authority. The certificate request is processed and a key chain is returned to the web browser which then stores the key chain locally.

Unfortunately, these approaches do not work well in a mobile environment. In particular, these approaches may be lacking where an application on a mobile device is not implemented as a web browser and its key storage is only accessible by the application and not by other tools such as browsers and management agents (e.g., mobile device management client software running on a mobile device). Accordingly, in such a scenario, each application itself must cooperate in the provisioning process to install credentials for use by the application. However, since most applications on mobile devices are installed by end users, complicated provisioning steps frequently fail or are deemed too complex. As a result, software developers opt for less complex provisioning processes that focus on the server side processing and hence provide less security on the client side.

Moreover, in some instances an entity that provides the mobile device to users, or that controls use of the mobile devices, may desire to create credentials in a certain manner. For example, the Department of Defense (DOD) mandates use of a personal access card (known as a Personal Identification Verification (PIV) card or Common Access Card (CAC)) with credentials stored thereon such that a physical card reader on a device can be used to authenticate a user by reading the card and allowing a user to provide the proper credentials. It may thus be desired to utilize these cards in the provisioning of credentials on the user's mobile device by, for example, utilizing credentials derived from the user's credentials on the access card or requiring a user to authenticate using the access card before such credentials are provisioned. As can be imagined, these types of requirements may further complicate the task of provisioning user credentials on a mobile device.

What is desired, then, are systems and method for provisioning client credentials on mobile devices that are both easy to utilize and secure. Additionally, it is desirable for entities to be able to easily define rules or policies around such credential provisioning.

To that end, among others, attention is now directed to the systems and methods for credential provisioning on a client device as disclosed herein. In particular, in certain embodiments, a provisioning server may be set up within an entity's enterprise environment. This provisioning server can then be used to provision a credential on a user's mobile device in association with a client application.

Turning to FIG. 1, one embodiment of an architecture including an enterprise environment 100 with such a credential provisioning server 110 is depicted. An enterprise (or entity) may refer to a group or organization such as government entity, business, non-profit or any other organization or association. Such an enterprise may operate or maintain an enterprise environment 100 including a number of associated computing devices that may be coupled together using a network 130. In many cases, the network 130 may be secured in some manner, such that devices or users must be authenticated before the device is allowed to connect to the network 130 or the user allowed to access resources available on the network 130. Such a network 130 may include, for instance, at least one of a wired network, a wireless network, a wide area network (WAN) a local area network (LAN), an Intranet, a virtual private network (VPN) over a publicly available network 160 such as the Internet, or some combination of computer networks, etc. The enterprise environment 100 may include a directory service server 140 that manages user accounts within the enterprise environment 100 and controls access to resources within the enterprise environment 100 (e.g., network resources such as application servers 190, 195 owned and operated by the enterprise). In this way, a user of the enterprise can authenticate through the directory service server 140 using their enterprise credentials (e.g., user name, email address, enterprise password, etc.) and gain access to resources of the enterprise. In the example of FIG. 1, application server 195 may reside outside of network 130. For instance, application server 195 may be hosted for the enterprise in a cloud computing environment external to network 130 and accessible by users of the enterprise over network 160 when authenticated, for example, over a private secure connection.

In many instances, administrators or others within the entity may desire to provision users with mobile devices 170 such as a smartphone, personal data assistant (PDA), tablet, etc. As discussed, many enterprises are highly concerned with security and allowing access to enterprise resources using mobile devices, especially given that the mobile device 170 may access the enterprise environment 100 through a publicly available network 160 like the Internet. Accordingly, in many instances, the enterprise may provide a client application 172 executing on the operating system (OS) 180 of the mobile device. The mobile devices 170 and OS 180 utilized may be almost any type of devices and OS desired, including for example, Apple or Samsung devices running versions of iOS or Android. At least because the client application 172 is capable of establishing a mutual secure connection (e.g., a communication link or path) with a server of the enterprise, as described further below, embodiments disclosed here may provide increased security when the client application 172 is accessing resources (e.g., services provided by directory service server 140, certificate authority servers 150, 155, application servers 190, 195, etc.) of the enterprise.

In one embodiment, this client application 172 may be a client application that facilitates the use of a virtual mobile device platform (e.g., a virtual device client). An example of a suitable virtual mobile device platform can be found in U.S. Pat. No. 9,667,703, issued on May 30, 2017, and entitled "SYSTEM, METHOD AND COMPUTER PROGRAM PRODUCT FOR GENERATING REMOTE VIEWS IN A VIRTUAL MOBILE DEVICE PLATFORM," which is fully incorporated by reference herein. While it will be understood that embodiments as depicted herein may be usefully utilized with client applications such as these, other embodiments may be equally effectively utilized with other types of client applications.

As one of the main purposes of the client application 172 in such an environment is to increase security in conjunction with access to an enterprise's resources, it may be desirable to utilize mutual authentication between the client application 172 and any servers with which it may communicate. This allows for the aforementioned mutual secure communication link be established between a client device (e.g., the mobile device 170) and a server machine (e.g., the application server 190). The security is "mutual" because the client device can prove (e.g., via a valid client certificate) that it is what it represents to the server machine and the server machine can also prove (e.g., verified via a trust store 178 included in the client application 172 or by "certificate pinning," explained below) that it is what it represents to the client device.

To establish such a mutual secure communication link, the client application 172 may utilize user credentials and associated one or more keystores/keychains 182 stored on the mobile device 170 by OS 180. However, as mentioned above, the provisioning of credentials on the client application 172 may be difficult, especially given the security consideration surrounding the deployment and use of these types of client applications 172 and their users. Accordingly, the client application 172 may include a credential provisioning module 174 that works in association with a credential provisioning server 110 in the enterprise environment 100 to provision user credentials on the mobile device 180 in association with the client application 172.

To further increase security of communications, in many instances, the client application 172 may include a trust store 178 (e.g., a list of trusted sources such as servers included in the code of the client application 172) or utilize "certificate pinning," such that a certificate or key associated with the credential provisioning server 110 or all the servers within enterprise environment 100 may be included in the client application 172. In this manner, only communications with servers within the enterprise environment 100 may be "trusted" or authenticated by the client application 172. Additionally, in some embodiments, the credential provisioning module 174 may only be allowed to access the content provisioning server 110 if the mobile device 170 has been authenticated on enterprise network 130 or if the credential provisioning module 174 accesses the credential provisioning server 110 on certain ports.

To illustrate in more detail, as these client applications 172 may be deployed on a number of different types of hardware platforms (e.g., iPhone, Android devices, etc.), each running a different type or version of an operating system, for instance, an administrator of the enterprise may define a number of rules or polices regarding the types of devices or operating systems (for purposes of this disclosure the terms "rule" and "policy" are used interchangeably). These rules 119 are then stored on or accessibly by the provisioning server 110 (e.g., in a rules database) for use in provisioning credential to the client application 172 on the mobile device 170. These rules 119 may define which client device types and/or operating systems versions can be provisioned and/or which are blacklisted (e.g., cannot have user credentials provisioned using the credential provisioning server whatsoever), whether user credentials are to be provisioned using the mobile device itself (e.g., which may be dependent on the entropy available in conjunction with a device), where the credentials are to be stored on the mobile device (e.g., which keystore/keychain 182 to utilize on the device if more than one is available for the device or operating system type or version), what type of key to utilize (e.g., Rivest-Shamir-Adleman (RSA) or Elliptical Curve Cryptography (ECC) key), the length of the key to utilize, or other type of rules or policies.

Figure 2:
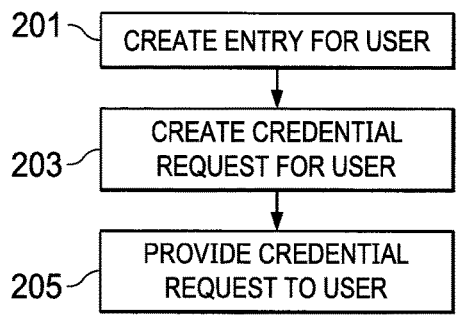
FIG. 2 is a flow chart showing an example of a credential provisioning process initiated by a network administrator according to some embodiments.

Referring to FIG. 2, which is a flow chart showing an example of a credential provisioning process, when an administrator at the enterprise wishes to provision a user account for the client application 172 at a particular user's device with credentials, the administrator may use the administrator interface 114 of the credential provisioning server 110 to create a user entry 118 in a data store at the provisioning server 110 (201). This user entry 118 may have a user identifier configured for associating a particular user with a corresponding account for the user on the enterprise's directory service server (e.g., an Active Directory or another Lightweight Directory Access (LDAP) protocol based server).

In some embodiments, the administrator may also create a credential request for the user using the administrator interface 114 (203). This credential request may include a link (e.g., Universal Resource Locator (URL)) to a credential provisioning service 112 provided by the credential provisioning server 110, a one-time password (OTP) (e.g., a random password, valid once or for a certain amount of time) and an identifier for the user. The OTP may, for example, be an HMAC based one-time password (HOTP). The OTP and user identifier may be encoded into the link itself, as is known in the art. The OTP may be stored in association with the user entry 118 in the data store at the credential provisioning server 110. The credential request may then be provided to the user (205). In one embodiment, the administrator may provide an email, text message, a physical printout, etc. with the link. In another embodiment, the link may be expressed as a Quick Response (QR) code, which can be provided to the user via a physical printout, an email, a web page in a browser on a PC, etc.

Figure 3:
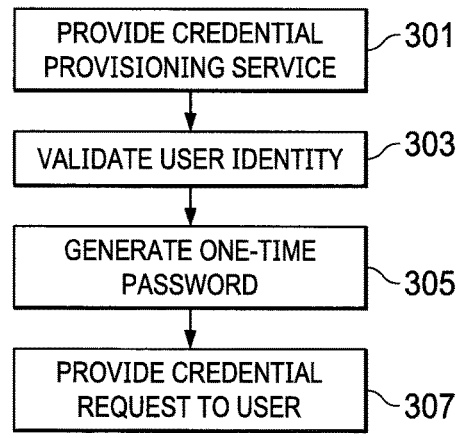
FIG. 3 is a flow chart showing an example of a credential provisioning process through user interaction with a credential provisioning server according to some embodiments.

A credential request can also be generated through a user interaction with the credential provisioning server 110. This process is shown in FIG. 3. For example, a user may navigate, via a browser or a web app, to one or more web pages configured for providing access to the credential provisioning service 112 provided by the credential provisioning server 110 (301). This web page may, for example, be restricted such that it can only be accessed from a device on an enterprise's private, internal, or restricted network 130. For example, the web page may be access by a user on an internal workstation 120 of the enterprise with a personal card access reader. Once the user is authenticated on this workstation 120 based on his personal access card, they may be allowed to access the web page through the internal workstation. As another example, the user may only access the web page on a device 170 if the device is on the enterprise's internal wireless network, etc.

When the web page is accessed the user may be required to validate his identity using authentication credentials, such as the user's enterprise account information with respect to directory service server 140 (e.g., Active Directory or LDAP account information) (303). If the user is authenticated, an OTP for the user may be generated (305), for instance, by an OTP generator 116, and stored with the user entry 118 on the credential provisioning server 110. Additionally, other user information may be stored in the user entry 118, including, for example, the user's email address, user name or other information for the user's enterprise account with directory servicer server 140 (e.g., Active Directory or LDAP account).

In one embodiment, all data (e.g., except for the key pair) that may be used to create a certificate request for the client may be stored in the user entry 118 at the credential provisioning server 110. A credential request may then be provided to the user through the web page (307). This credential request may include a link to the credential provisioning service 112 provided by the credential provisioning server 110 with a one-time password (OTP) and an identifier for the user. This link may be expressed as a QR code, which can be presented to the user through the web page.

The client application on the user's device may include a QR code reader 176 such that when a QR code with a credential request is presented to the user in the form of a QR code (e.g., emailed, provided on a physical printout, presented through an accessed web page, etc.), the QR code reader 176 of the client application 172 may be activated and used to scan the QR code. The receipt of the credential request (from FIG. 2 or FIG. 3) by the user's device (e.g., the mobile device 170), for instance, by the QR code reader 176 reading of the QR code may, in turn, cause credential provisioning module 174 in the client application 172 to request the link (e.g., URL) embedded in the QR code. As an example, the link may include the location of the credential provisioning service 112 (e.g., a network address at the credential provisioning server 110), the OTP, and an identifier for the user associated with the user device.

In some instances, if a user accesses a web page to obtain a credential request on the same device on which the client application 172 resides (e.g., the user's mobile device 170), it may be difficult, if not impossible to scan a QR code presented in a web page on that device with a QR code reader 176 embedded in a client application 172 on that device 170. To address this issue, in some embodiments, the credential request may be provided to the user through the web page as a "deep link" directed to the credential provisioning module 174 in the client application 172 and causing the credential provisioning module 174 in the client application 172 to request the link (e.g., URL) included in the deep link, where the requested link includes location of the credential provisioning service 112, the OTP, and an identifier for the user.

Additionally, when the credential provisioning module 174 issues a request for the link, the credential provisioning module 174 may include, in the request, data on the device type (e.g., mobile device model), OS type and version. In one embodiment, the credential provisioning module 174 may access this information using an application programming interface (API) provided by the OS 180 on the device such that the information can be provided in the request (e.g., in the parameters of the request).

Thus, irrespective of how the credential request was provided to the user, the credential provisioning module 174 application may send a request for credentials to the credential provisioning service 112 provided by the credential provisioning server 110, where the request includes an identifier for the user, the OTP for the user, the device type, and the OS type and version running on the device 170. Additionally, a temporary encryption password may be generated by the credential provisioning module 174 and included with the request for credentials. This temporary encryption password is saved temporarily (e.g., for the duration of the credential request, which may take only seconds and not hours or days) by credentials provisioning module 174 for later use in decrypting data (e.g., such as certificates, keys, PFX files, P12 files, etc.) that may be received in encrypted form from credential provisioning server 110. A Personal information exchange (PFX) certificate is required by Microsoft® to digitally sign the System Center Mobile Device Manager software package before distribution. The PKCS or PFX format is a binary format for storing the server certificate, any intermediate certificates, and the private key into a single encryptable file. Files having this kind of binary format are usually found with the extensions .pfx and .p12. A .p12 file contains the certificates that Apple Inc. needs in order to build and publish apps. These types of certificate files are known to those skilled in the art and thus are not further described herein.

To further ensure security, in some embodiments the credential provisioning server 110 (or credential provisioning service 112) may only be made available over an enterprise's internal network 130 such that the request can only be received if the user's mobile device 170 has already been authenticated on the enterprise's internal network 130. Alternatively, the credential provisioning service 112 may only be made available over a particular port (which may, or may not, be a typically accessed port). The port (e.g., a default server address or network communication port) may be encoded into the credential request provided to the credential provisioning module 174 (e.g., encoded in the QR code or link provided to the credential provisioning module 174) such that the request is sent from the credential provisioning module 174 to the correct port.

Figure 4:
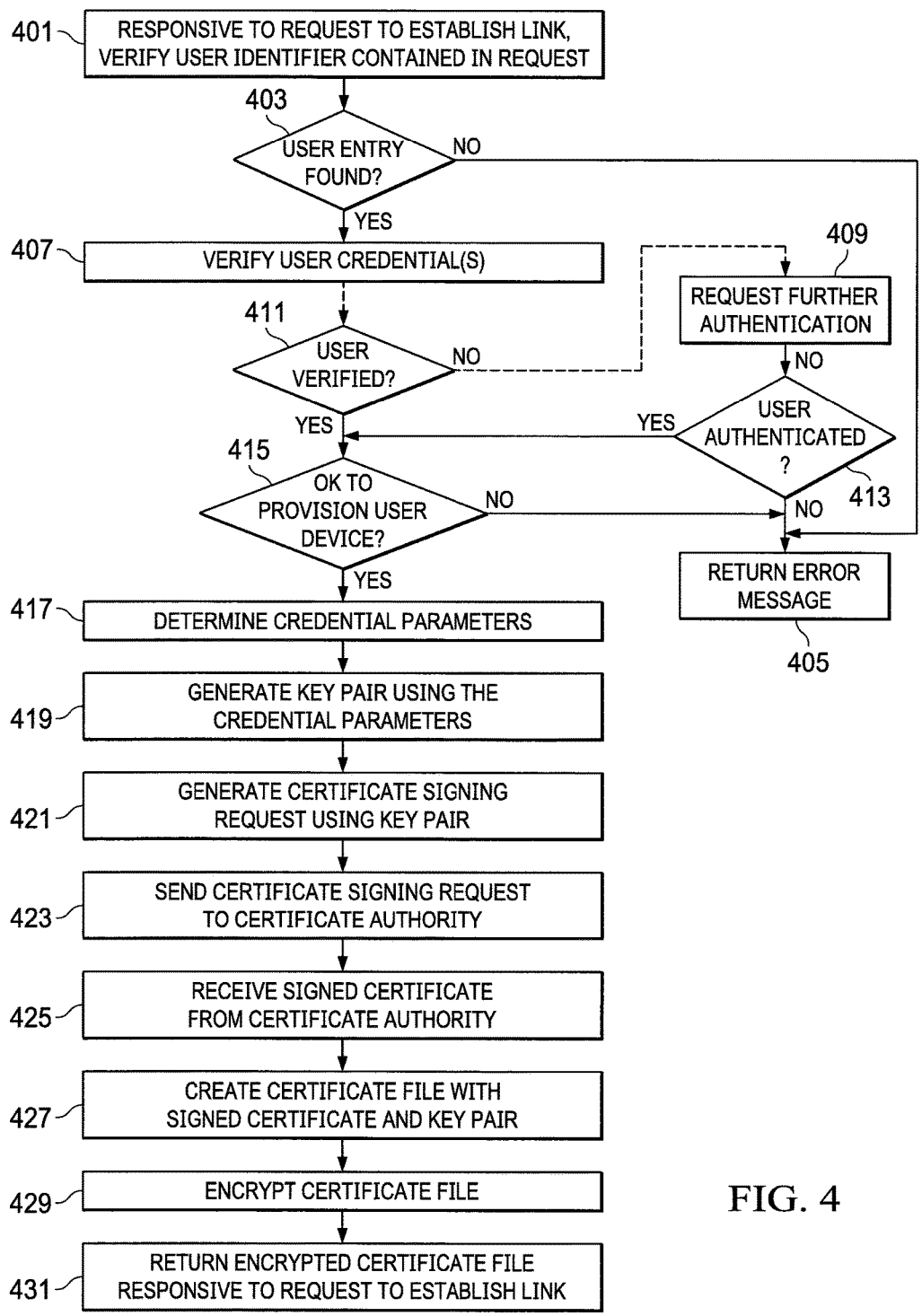
FIG. 4 is a flow chart showing an example of a credential provisioning process performed at the server side according to some embodiments.

Referring to FIG. 4, when the request from the credential provisioning module 174 is received by the credential provisioning server 110 via the credential provisioning service 112, the user identifier may be obtained from the request (401) and used to determine if there is a corresponding entry 118 for the user in the data store of the credential provisioning server 110 (403). If there is no entry an error message may be returned (405). If there is an entry 118 in the data store for the user, the OTP password received in the request may be compared against the OTP password stored in the data store in the entry 118 for the user (407).

Additionally, in one embodiment, a response may be returned to the credential provisioning module 174 requesting further authentication from the user (409). This authentication may be made based on a user's enterprise credentials with directory service server 140 (e.g., Active Directory or LDAP credentials). Specifically, the response from the credential provisioning service 112 may request the user's username and password for the user's enterprise account. When the credential provisioning service 112 receives the user's enterprise credentials from credential provisioning module 174 it can verify these credentials using the enterprise's directory service server 140 to determine if they are correct (411). If further authentication is requested from the credential provisioning service 112, the credential provisioning module 174 may store the user's provided enterprise password for later use in decrypting data (e.g., such as certificates, keys, P12 files, etc.) that may be received in encrypted form from credential provisioning server 110. The user's enterprise password may thus be stored or used in lieu of a temporary encryption password.

If either the OTPs for the user (e.g., the received OTP and the OTP associated with the entry 118 for the user) do not match, or the user cannot be verified using the user's enterprise credentials (413), an error message may be returned to the credential provisioning module 174 and presented to the user (405). If, however, the user can be authenticated (e.g., the OTPs received match and the user's enterprise credentials are verified using the directory service server 140), the credential provisioning service 112 can access the rule base 119 based on the mobile device model, OS type or OS version received in the credential request to determine if the mobile device 170 from which the credential request was received is "blacklisted" (415).

In particular, there may be certain types of mobile devices or operating systems that administrators or others within an enterprise have deemed too insecure to be provisioned with credentials, or do not want them to be provisioned with credential for other reasons. These mobile devices may be identified by device model, OS type or OS version on a blacklist stored in the rule base 119. If the mobile device 170 from which the credential request was received is on the blacklist (or not selected or not suitable for provisioning), an error message may be returned to the credential provisioning module 174 by the credential provisioning service 112 and presented to the user (405).

Alternatively, in one embodiment, a "whitelist" may be used. In this case, there may be certain types of mobile devices or operating systems that administrators or others within an enterprise have deemed as secure enough to be provisioned with credentials. These mobile devices may be identified by device model, OS type or OS version on a whitelist stored in the rule base 119. If the mobile device 170 from which the credential request was received is not on this whitelist (415), an error message may be returned to the credential provisioning module 174 by the credential provisioning service 112 and presented to the user (405).

If the mobile device 170 (or OS, OS type, etc.) is not on the blacklist (or is on the whitelist), the credential parameters may be determined (417), for example, from the rule base 119 based on the type of mobile device, the OS type or OS version or other criteria associated with the credential request. These credential parameters may include where the credentials should be generated, the type or length of key to use, the keystore/keychain where the credentials should be stored, or other desired parameters.

If it is determined that the credential should be generated at the credential provisioning server 110, the credential provisioning service 112 may access the user's enterprise account information (e.g., through directory service server 140 or as stored in the user entry 118 in the data store on the credential provisioning server 110) to determine the user's common name for the enterprise account and the user's email address. The credential provisioning service 112 can then generate a key pair (e.g., a corresponding public and private key) of the appropriate type (as determined from the rule base 119). The key pair may be generated, for example, based on the user's common name or other parameter associated with the user's enterprise account (419).

Referring to FIG. 4, the credential provisioning service 112 can then create a certificate signing request (CSR) using the generated key pair and the user's enterprise account information (e.g., the user's common name or email address) (421). This certificate signing request may, for example, may adhere to the Public Key Cryptography Standards (PKCS) #10 or #12.

The credential provisioning service 112 provided by the credential provisioning server 110 can then send the CSR to a certificate authority (423). In one embodiment, the credential provisioning service 112 may send the CSR to a custom certificate authority 150 implemented in the enterprise environment 100. Alternatively, the credential provisioning service 112 may utilize a third party certificate authority 155. For example, in many cases, a directory service 140 (e.g., Active Directory or the like) may provide a web service or other interface through which a CSR may be submitted to a certificate authority 155 and a signed certificate received in response. In still another embodiment, a SCEP service may be used to submit the CSR and receive a signed certificate in return.

When the signed certificate is returned to the credential provisioning service 112 (425), a file may be created with the signed certificate and the key pair created (by the credential provisioning service 112) for the client application 172 (427). For example, a file in the P12 format (e.g., a .p12 file such as certificate.p12) with the signed certificate and the key pair may be created (427). The file can be encrypted (429) with the user's temporary encryption password (as provided in a credential request) or a user's enterprise password (e.g., the password the user utilizes for his enterprise account with the directory service server 140). This P12 file may be returned to the credential provisioning module 174 on the mobile device (431) along with an identifier of the location of the keystore/keychain 182 to store the certificate and keys.

The credential provisioning module 174 on the mobile device 170 may decrypt the file using the stored password associated with the initial credential request (e.g., the user's enterprise password or the generated temporary encryption password) and stored the credentials (e.g., the signed certificate and the private key) in the specified keystore/keychain 182 (e.g., using an API provided by the OS on the device). In this manner, credentials may be provisioned on the mobile device 170 in association with the client application 172 based on keys and a certificate generated at the credential provisioning server 110.

In some cases, it may be desirable to generate the keys on the mobile device 170 itself such that a generated private key is never exposed anywhere but on the device itself. Thus, in some embodiments, if an administrator has deemed a certain device type, OS type or version as having sufficient entropy or other characteristics to provide a desired level of security in such key generation, at the point the credential parameters are determined from the rule base 119 it will be determined that the credentials should be generated at the mobile device 170. Here, the credential provisioning service 112 may access the user's enterprise account information (e.g., through directory service server 140 or as stored in the user entry in the data store 118 on the credential provisioning server 110) to determine the user's common name for the enterprise account and the user's email address. The credential provisioning service 112 may then reply to the credential provisioning module 174 of the client application 172 with an indication that the credential provisioning module 174 should generate the keys along with a set of credential data for use in generating the keys and a CSR. This credential data may include the user's common name (or an alternate name), the user's email address, the key size, the key type, the domain, the keystore/keychain to use, etc.

The credential provisioning module 174 of the client application may generate a key pair (e.g., a corresponding public and private key) of the appropriate type (as determined from the received credential data). The key pair can then be stored in the specified keystore/keychain 182 by the credential provisioning module 174. The credential provisioning module 174 can then create a CSR using the generated key pair and the provided credential data (e.g., the user's common name or email address). This certificate signing request may, for example, may adhere to the Public Key Cryptography Standards (PKCS) #10 or #12. The CSR may be signed with the generated private key. The credential provisioning module 174 may then send a request to the credential provisioning service 112 to have the CSR signed. This request can also include further verification information such as the OTP for the user, etc.

When the credential provisioning service 112 receives the request including the CSR, it may verify the request by, for example verifying the OTP included in the request or possibly verifying the information inside the CSR itself (using a public key as provided in the same or a different request or communication from the credential provisioning module 174). If the request to sign the CSR is verified, the credential provisioning service 112 can then send the CSR to a certificate authority as detailed above. When the signed certificate is returned to the credential provisioning service 112, the signed certificate may be returned to the credential provisioning module 174 of the client application 172 along with an identification of the keystore/keychain 182 in which to store the certificate and keys if it has not already been provided. The credential provisioning module 174 may store the received signed certificate in the specified keystore/keychain 182 in conjunction with the stored keys (e.g., using an API provided by the OS on the device). In this manner, credentials may be provisioned on the mobile device 170 in association with the client application 172 based on keys generated at the mobile device 170 and a signed certificate generated using the credential provisioning server 110.

As can be seen, embodiments as depicted herein may greatly streamline the provisioning of credentials in association with deployed application on mobile devices. The user can deploy their credentials with relatively few actions, does not have to physically hook up their mobile device to a computer, and as a result, does not require expensive mobile management software to be installed or used during the provisioning process. Administrators can configure the system in advance such that users can "self-deploy" without having to be physically present with the user during the provisioning step. When used to provision users who purchase or download the application from a consumer application store (e.g. Apple App Store or Google Play Store), users are much less likely to drop out and abandon the application during provisioning. The result is few lost opportunities and lower support costs.

In some cases, multiple users may share a single device. For example, a retail store or hospital may want their sales clerks or nurses using a shared device or a bank of devices. In such cases, to provision shared devices, an administrator still creates user entries as described above, for instance, in LDAP, and assigns a virtual device for each of them. In one embodiment, authentication can be done per account with multiple accounts associated with a client device (a shared device). When the shared device is provisioned and when a user connects using the shared device, a client certificate can be used to validate that the shared device can connect to the server (so as to protect against a variety of attacks). In some cases, a different authentication mechanism can be used such that the shared device does not rely upon a user's certificates, but is still protected by a shared "device credential." A goal here is not to change the users or how their virtual devices are created and to limit the user interface changes to the clients. That is, end users may not notice any difference in how a single user device is provisioned versus how a shared device is provisioned. To this end, a shared device provisioning process will be described below. It will be understood that any restrictive language discussed with respect to embodiments shown in the drawings, such as "must", "should", "required", etc., should be taken to apply only to those particular embodiments discussed herein and not to embodiments generally.

Figure 5:
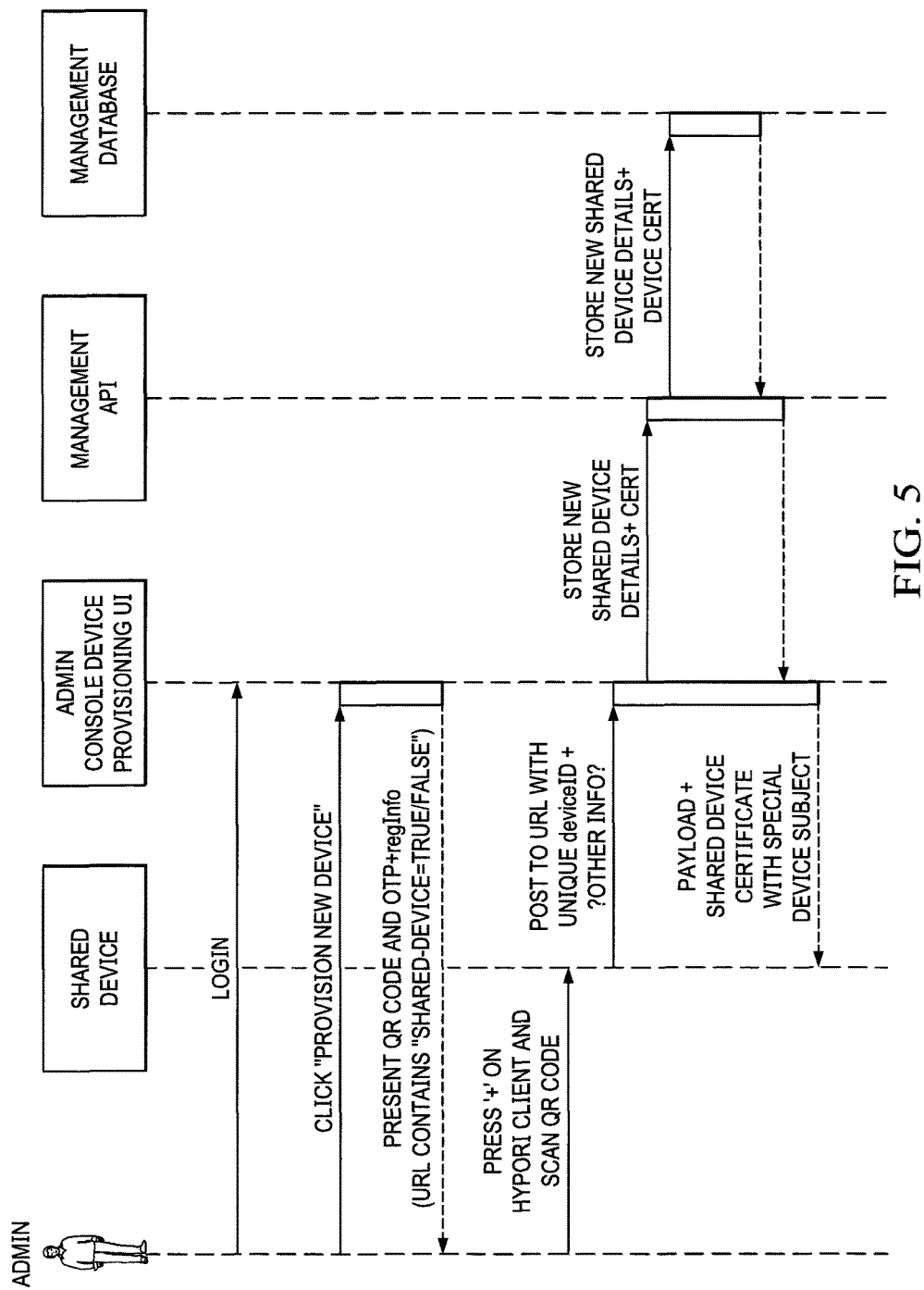
FIG. 5 depicts a sequence diagram illustrating an example of a credential provisioning process involving a shared device according to some embodiments.

FIG. 5 depicts a sequence diagram that illustrates an example of a shared device provisioning process initiated by a network administrator. In some embodiments, rather than an administrator setting up a means for an individual user to self-provision (e.g., using web page, see FIG. 3) or be invited (e.g., via an email with an OTP, see FIG. 2), the administrator can choose to setup a shared device using one of the following methods:

The administrator, while using the admin console (e.g., the administrator interface 114), requests a new shared device credential. The admin console may, in response, show the registration information and an OTP on the screen as text and as a QR code.

The administrator, using a web browser on a device, points the browser to a "shared devices" provisioning web page and logs into the web page. After logging in, the page may show a link to start provisioning the shared device credential. This method could make it easier for a user to self-provision if there is no camera on the shared device for scanning a QR code.

In some embodiments, to provision the credentials and the account onto the mobile device in the case that it was started from the admin console can be performed as follows:

Admin brings up the client and, if not the first account on the device, clicks on the '+' to add an account.

Admin chooses "Use My QR Code" and scans the QR code on the web page in the admin console. Alternatively, they can choose "Use My OTP" option. In the latter, they must fill in all of the required information (e.g., username, server, etc.) on the provisioning page in the admin console in addition to the OTP.

The client contacts the provisioning server with the OTP and the other parameters (e.g., entered manually or via the QR code) and can be optionally prompted for the admin's password.

The provisioning server returns a payload that describes the account information and the client's credential.

The client stores the account with the credentials.

In some embodiments, if the admin started the provisioning from the browser, the following steps may be performed:

The admin clicks on the link in the browser page to start the provisioning process.

The client starts and is taken to the provisioning page with all of the information (e.g., OTP, user info, server, etc.) pulled from the parameters in the link.

The client contacts the provisioning server with the OTP and the other parameters (entered manually or via the QR code) and can be optionally prompted for the admin's password.

The provisioning server returns a payload that describes the account information and the client's credential.

The client stores the account with the credentials.

Figure 6:
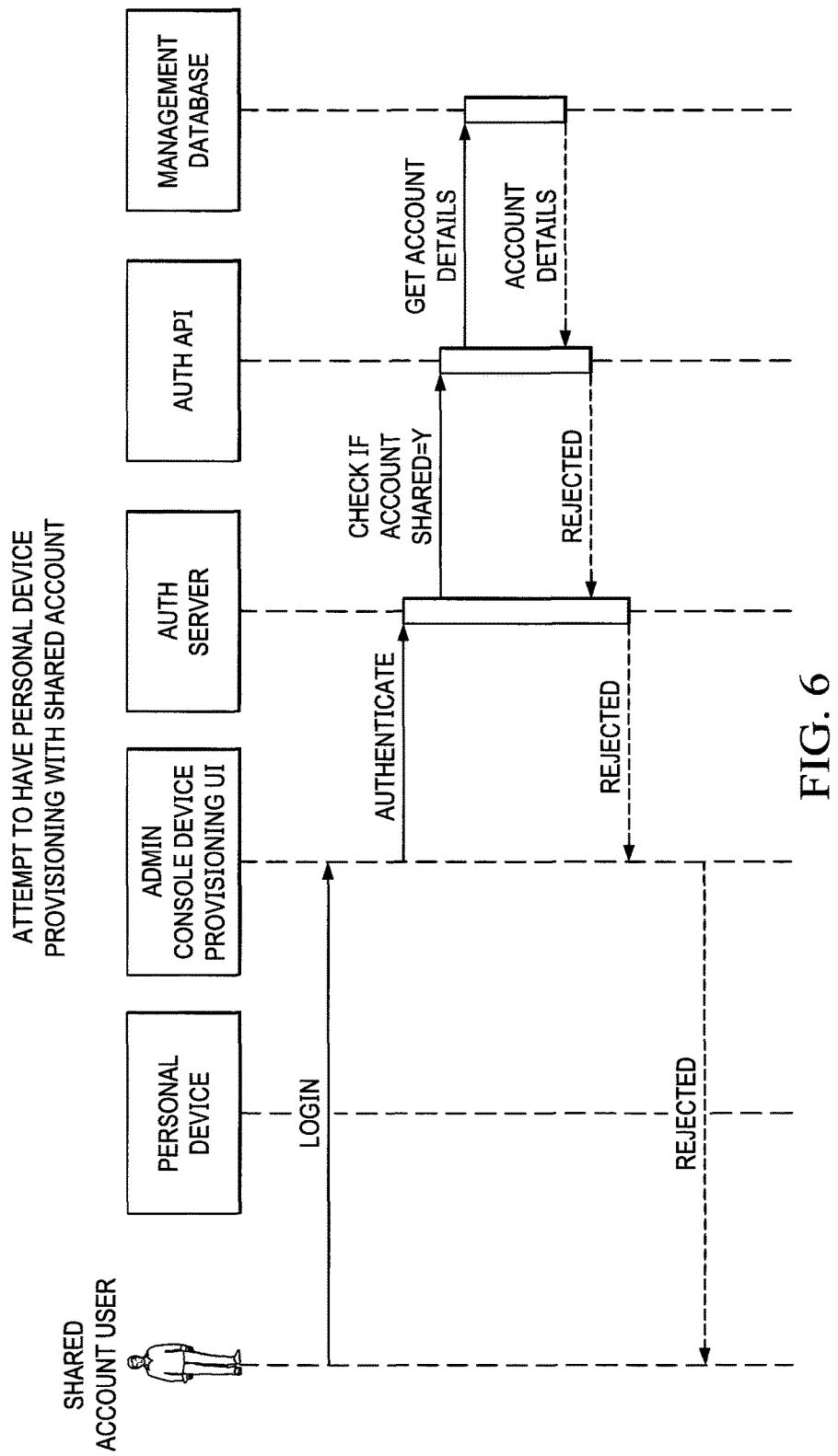
FIG. 6 depicts a sequence diagram illustrating an example of rejecting a request from a shared account user to provision a personal device according to some embodiments.
Figure 7:
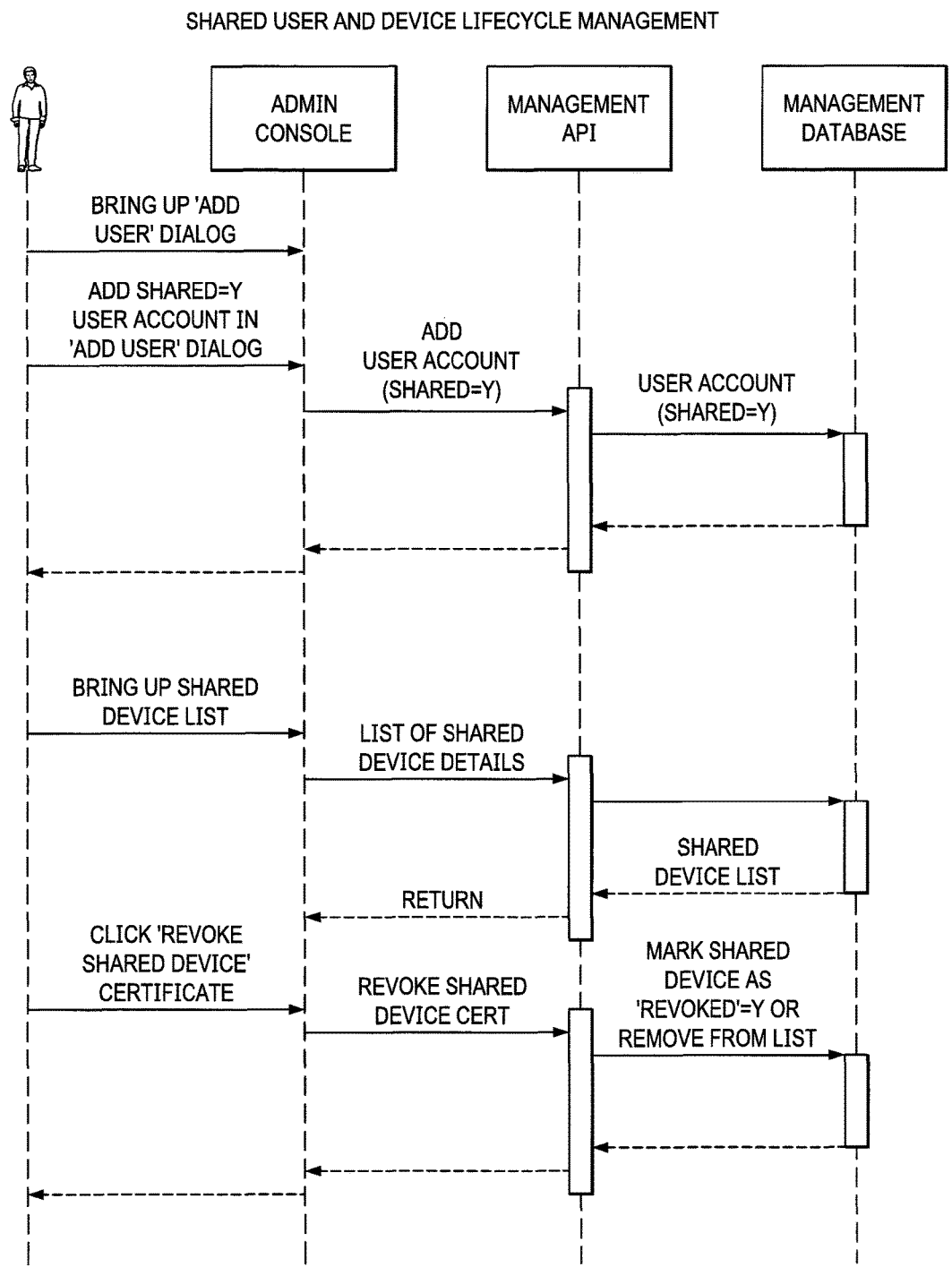
FIG. 7 depicts a sequence diagram illustrating an example of shared device certificate management in conjunction with device lifecycle management.

In some embodiments, the new link (which is encoded in the web page or in the QR code, as described above) can include a new parameter field called "shared-device." Its value can be set to "true" for a shared device account or "false" for a regular account. If it is missing, it is a regular account (i.e., presumed false). When the client's provisioning code sees the "shared-device=true" parameter in the URL, it will include a unique identifier from the device (e.g., Settings.System.ANDROID_ID if the device is an Android device) in the post arguments to the provisioning server when fetching its provisioning payload. In one embodiment, the payload (e.g., a JSON string) delivered to the client may have additional information included in its JSON payload, in addition to the device certificate associated with the keys. Additional checks may be implemented at the server side to manage shared accounts. For example, as illustrated in FIG. 6, when a shared account user attempts to provision a personal device, the request may be rejected if the account is a shared device account. In some embodiments, only an administrator can add shared devices. In another example, as illustrated in FIG. 7, device certificates may be managed in conjunction with device lifecycle management such that a shared device certificate can be revoked as needed.

Figure 8:
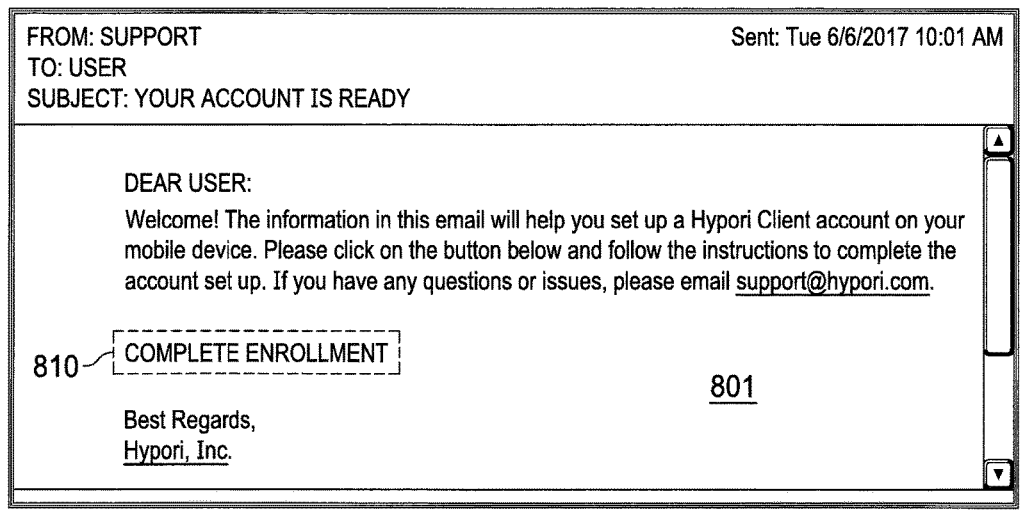
FIG. 8 depicts an example of an email that a user may receive from an administrator inviting the user to complete an enrollment process according to some embodiments.

FIG. 8 depicts an example of an email that a user may receive from an administrator. As illustrated in FIG. 8 and described above with reference to FIG. 2, the administrator may provide email 801 to invite the user to complete a process to provision the user's device for running a client application (e.g., the client application 172). In some embodiments, this client application may provide access to mobile applications running on a virtual device platform or virtual machine infrastructure (VMI). As a non-limiting example, the virtual device platform may include at least one application server (e.g., application server(s) 190, 195). As illustrated in FIG. 8, email 801 may include a selectable element 810.

Responsive to the user clicking on the selectable element 810, a browser on the user device (on which the email is received) may attempt to open a new browser window at a special URI (Universal Resource Indicator) that, for instance, points to a network address in the virtual device platform. If the client application is not found on the user's device (e.g., not installed), the user may be prompted to download the client application from an electronic store on the Internet or from an enterprise network. For example, an "app store" button may appear on the browser window and the user may select the "app store" button to launch the app store application. This may cause the user to leave the browser environment so that the user can download and install the client application from the app store. The user can open the client application from the app store or launch the client application once it is installed. If the client application is found on the user's device, the user can click on or otherwise select a user interface element or icon representing the client application displayed in the browser window. Initially, responsive to the user launching or selecting the client application, the client application may display a message indicating that no account has been configured and provide an option for the user to add an account or to contact the administrator. In some embodiments, responsive to a request from the client application (which is now installed and run on the user's device) to add an account, a credential provisioning process is started and performed as described above with reference to FIG. 4.

Figure 9:
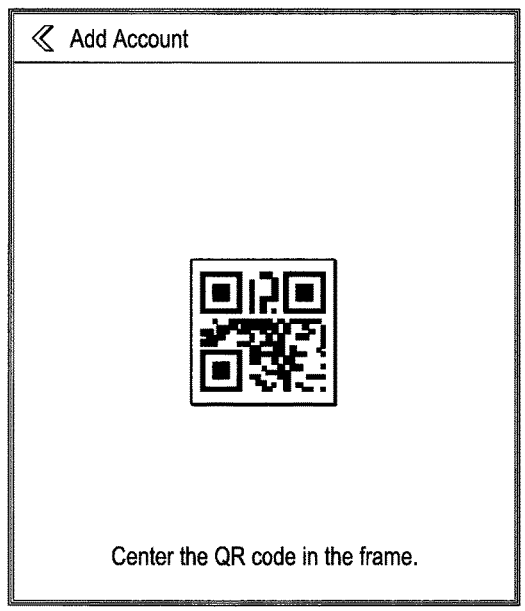
FIGS. 9-11 depict diagrammatic representations of examples of a user interface showing different methods that a user can use to add an account of an application on the user's device according to some embodiments.

As discussed above, an account can be added using a QR code, a one-time password (OTP), or an existing user account. FIG. 9 is a diagrammatic representation of an example of a user interface on a client device (e.g., the authentication workstation 120, the mobile device 170, etc.) on which a QR code may be displayed to a user wishing to add an account (i.e., provision a client application to run on the client device) through the credential provisioning process described above.

Figure 10:
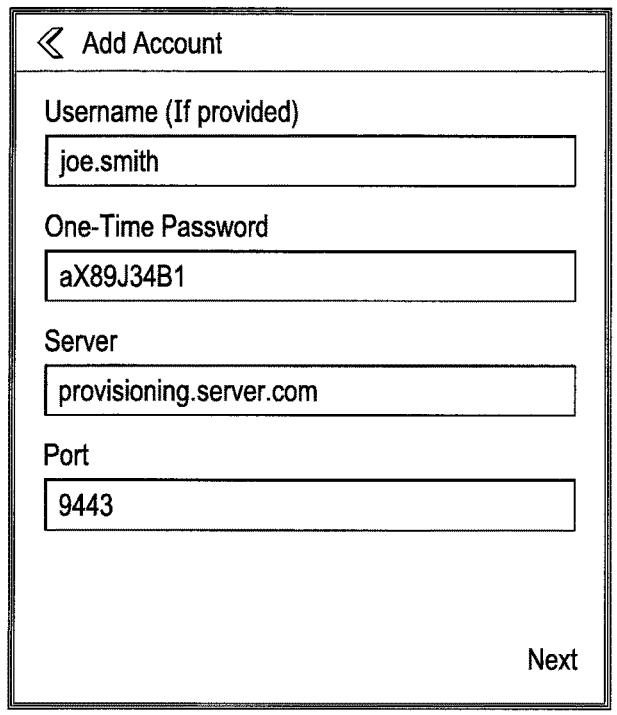

FIG. 10 is a diagrammatic representation of an example of a user interface on a client device illustrating an example of a page that may be displayed to a user wishing to add an account (i.e., provision a client application to run on the client device) using the OTP. This page provides fields for the user to enter values required to complete an enrollment process initiated by an administrator (e.g., FIG. 2). The fields can be validated for correct syntax. In one embodiment, the "Next" button on the page may be disabled if the values entered by the user are determined to be invalid. This page may be provided as a fallback if there is no option for the user to use a deep link or to scan a QR code with the device's camera.

Figure 11:
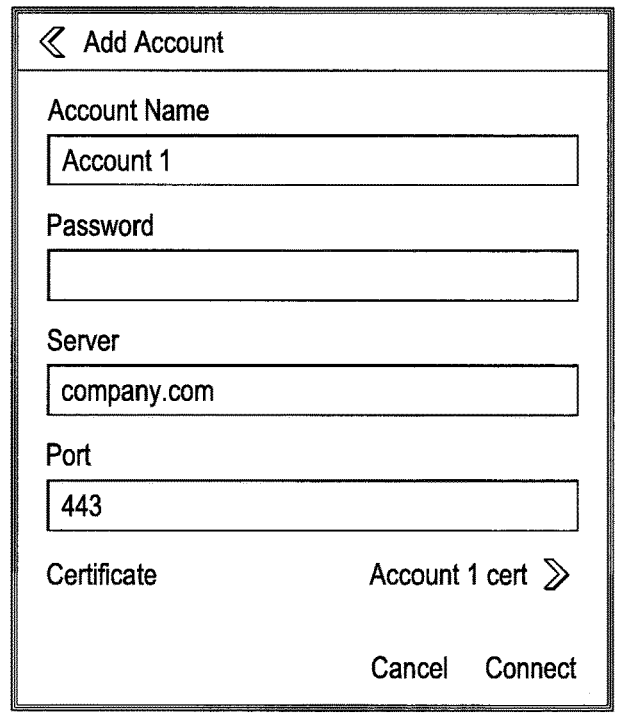

FIG. 11 is a diagrammatic representation of an example of a user interface on a client device illustrating an example of a page that may be displayed to a user wishing to provision a client application on the client device using an existing user account. For this method, the user must have all of the connection settings for the account. Fields for the connection settings are displayed and validated. If any field values are invalid, the "Connect" button is disabled. In some embodiments, the client application may respond to the user selecting the "Connect" button as follows, depending upon the user device's operating system:

| Platform | Actions on Connect |
| --- | --- |
| Android | First, the account is authenticated with the authentication server to verify that the account is valid. Second, the account information is saved on the device. The account is not saved on the device until authentication succeeds. |
| iOS | The account information is saved on the device. Once the account is saved, the account is authenticated with the authentication server to verify that the account is valid. |

In some embodiments, an error page is displayed if connecting to the authentication server fails, if the authentication fails, or if the save fails. If the account is successfully saved, the client application automatically starts the process of connecting to the virtual device running on the virtual device platform.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, the meaning of "in" includes "in" and "on" unless the context clearly dictates otherwise. The scope of the present disclosure should be determined by the following claims and their legal equivalents.

What is claimed is:

1. A credential provisioning method for provisioning a client application on a client device, the credential provisioning method comprising:

receiving, by a credential provisioning server, a request from a credential provisioning module running within the client application on the client device to provision a user account for the client application on the client device, the request containing a one-time password for a user and an identifier for the user;

determining, by the credential provisioning server using the identifier for the user, whether a user entry is stored in a data store communicatively connected to the credential provisioning server;

if the user entry is not found in the data store by the credential provisioning server, returning an error message to the credential provisioning module running within the client application on the client device;

if the user entry is found in the data store by the credential provisioning server, determining whether the one-time password contained in the request from the credential provisioning module running within the client application on the client device matches a one-time password associated with the user entry stored in the data store;

if the one-time password contained in the request from the credential provisioning module running within the client application on the client device matches the one-time password associated with the user entry stored in the data store, accessing, by the credential provisioning server, a rules database;

determining, by the credential provisioning server based on at least one credential provisioning rule from the rules database, whether to proceed with the provisioning of the user account for the client application on the client device;

if the credential provisioning server determines to proceed with the provisioning of the user account for the client application on the client device based on the at least one credential provisioning rule from the rules database, the credential provisioning server performs:

generating, by the credential provisioning server, a key pair using credential parameters associated with the request from the credential provisioning module running within the client application on the client device;

generating, by the credential provisioning server, a certificate signing request using the key pair and user information specific to the user;

communicating, by the credential provisioning server, the certificate signing request to a certificate authority;

receiving, by the credential provisioning server, a signed certificate from the certificate authority;

encrypting, by the credential provisioning server using an enterprise password provided to the credential provisioning server by the user or using a temporary encryption password generated and provided to the credential provisioning server by the credential provisioning module running within the client application on the client device, the signed certificate received from the certificate authority and the key pair generated by the credential provisioning server; and sending the signed certificate and the key pair that have been encrypted by the credential provisioning server and identifying information of a key store or keychain location on the client device to the credential provisioning module running within the client application on the client device, the client application storing, using the identifying information, the signed certificate and the key pair at the key store or keychain location on the client device to thereby complete the provisioning of the user account for the client application on the client device.

2. The credential provisioning method according to claim 1, wherein the client application is operable to:

prior to storing the signed certificate and the key pair at the key store or keychain location on the client device, decrypt the signed certificate and the key pair using the temporary encryption password or the enterprise password; and establish a mutual secure connection with a trusted server over a network using the signed certificate and the key pair stored at the key store or keychain location on the client device.

3. The credential provisioning method according to claim 2, wherein the trusted server operates on a virtual device platform and, once the mutual secure connection is established, the client application is operable to utilize resources of the virtual device platform.

4. The credential provisioning method according to claim 1, wherein if the credential provisioning server determines, based on the at least one credential provisioning rule from the rules database, that the provisioning of the user account for the client application is to take place on the client device:

the credential provisioning server determines a name and email address for the user based on enterprise account information associated with the user;

the credential provisioning server sends an instruction and credential data to the credential provisioning module running within the client application on the client device, the credential data including the name and email address for the user and identifying information of a key store or keychain location on the client device;

responsive to the instruction from the credential provisioning server, the credential provisioning module running within the client application on the client device performs:

generating a pair of keys;

storing, based on the identifying information, the pair of keys at the key store or keychain location on the client device;

generating a certificate signing request using the pair of keys and the credential data; and communicating the certificate signing request to the credential provisioning server;

the credential provisioning server verifies the certificate signing request;

if the certificate signing request is verified by the credential provisioning server, the credential provisioning server sends the certificate signing request from the credential provisioning module running within the client application on the client device to a certificate authority and returns a signed certificate from the certificate authority to the credential provisioning module running within the client application on the client device; and if the certificate signing request is not verified by the credential provisioning server, the provisioning of the user account for the client application is terminated.

5. The credential provisioning method according to claim 1, wherein the certificate authority operates internal or external to a secure network within which the credential provisioning server operates.

6. The credential provisioning method according to claim 1, wherein the credential provisioning module running within the client application on the client device receives the one-time password for the user via an email, a text message, or a QR code.

7. The credential provisioning method according to claim 6, wherein the email, the text message, or the QR code is generated via an administrator interface of the credential provisioning server.

8. A credential provisioning system for provisioning a client application on a client device, the credential provisioning system comprising:

a credential provisioning server having at least one processor and at least one non-transitory computer-readable medium storing instructions translatable by the at least one processor;
a data store communicatively connected to the credential provisioning server, the data store storing user entries; and
a rules database storing credential provisioning rules;
wherein, when the instructions are translated by the at least one processor of the credential provisioning server, the credential provisioning server is operable to perform:
 receiving a request from a credential provisioning module running within the client application on the client device to provision a user account for the client application on the client device, the request containing a one-time password for a user and an identifier for the user;
 determining, using the identifier for the user, whether a user entry is stored in the data store;
 if the user entry is not found in the data store by the credential provisioning server, returning an error message to the credential provisioning module running within the client application on the client device;
 if the user entry is found in the data store by the credential provisioning server, determining whether the one-time password contained in the request from the credential provisioning module running within the client application on the client device matches a one-time password associated with the user entry stored in the data store;
 if the one-time password contained in the request from the credential provisioning module running within the client application on the client device matches the one-time password associated with the user entry stored in the data store, accessing the rules database;
 determining, based on at least one credential provisioning rule from the rules database, whether to proceed with the provisioning of the user account for the client application on the client device;
 if the credential provisioning server determines to proceed with the provisioning of the user account for the client application on the client device based on the at least one credential provisioning rule from the rules database, the credential provisioning server performs:
  generating a key pair using credential parameters associated with the request from the credential provisioning module running within the client application on the client device;
  generating a certificate signing request using the key pair and user information specific to the user;
  communicating the certificate signing request to a certificate authority;
  receiving a signed certificate from the certificate authority;
  encrypting, using an enterprise password provided to the credential provisioning server by the user or using a temporary encryption password generated and provided to the credential provisioning server by the credential provisioning module running within the client application on the client device, the signed certificate received from the certificate authority and the key pair generated by the credential provisioning server; and
  sending the signed certificate and the key pair that have been encrypted by the credential provisioning server and identifying information of a key store or keychain location on the client device to the credential provisioning module running within the client application on the client device, the client application storing, using the identifying information, the signed certificate and the key pair at the key store or keychain location on the client device to thereby complete the provisioning of the user account for the client application on the client device.

9. The credential provisioning system of claim 8, wherein the client application is operable to:
 prior to storing the signed certificate and the key pair at the key store or keychain location on the client device, decrypt the signed certificate and the key pair using the temporary encryption password or the enterprise password; and
 establish a mutual secure connection with a trusted server over a network using the signed certificate and the key pair stored at the key store or keychain location on the client device.

10. The credential provisioning system of claim 9, wherein the trusted server operates on a virtual device platform and, once the mutual secure connection is established, the client application is operable to utilize resources of the virtual device platform.

11. The credential provisioning system of claim 8, wherein if the credential provisioning server determines, based on the at least one credential provisioning rule from the rules database, that the provisioning of the user account for the client application is to take place on the client device:
 the credential provisioning server determines a name and email address for the user based on enterprise account information associated with the user;
 the credential provisioning server sends an instruction and credential data to the credential provisioning module running within the client application on the client device, the credential data including the name and email address for the user and identifying information of a key store or keychain location on the client device;
 responsive to the instruction from the credential provisioning server, the client credential provisioning module running within the client application on the client device performs:
  generating a pair of keys;
  storing, based on the identifying information, the pair of keys at the key store or keychain location on the client device;
  generating a certificate signing request using the pair of keys and the credential data; and
  communicating the certificate signing request to the credential provisioning server;
 the credential provisioning server verifies the certificate signing request;
 if the certificate signing request is verified by the credential provisioning server, the credential provisioning server sends the certificate signing request from the credential provisioning module running within the client application on the client device to a certificate authority and returns a signed certificate from the certificate authority to the credential provisioning module running within the client application on the client device; and if the certificate signing request is not verified by the credential provisioning server, the provisioning of the user account for the client application is terminated.

12. The credential provisioning system of claim 8, wherein the certificate authority operates internal or external to a secure network within which the credential provisioning server operates.

13. The credential provisioning system of claim 8, wherein the credential provisioning module running within the client application on the client device receives the one-time password for the user via an email, a text message, or a QR code.

14. The credential provisioning system of claim 13, wherein the email, the text message, or the QR code is generated via an administrator interface of the credential provisioning server.

15. A computer program product for provisioning a client application on a client device, the computer program product comprising at least one non-transitory computer-readable medium storing instructions translatable by at least one processor of a credential provisioning server for:
   receiving a request from a credential provisioning module running within the client application on the client device to provision a user account for the client application on the client device, the request containing a one-time password for a user and an identifier for the user;
   determining, using the identifier for the user, whether a user entry is stored in a data store communicatively connected to the credential provisioning server;
   if the user entry is not found in the data store by the credential provisioning server, returning an error message to the credential provisioning module running within the client application on the client device;
   if the user entry is found in the data store by the credential provisioning server, determining whether the one-time password contained in the request from the credential provisioning module running within the client application on the client device matches a one-time password associated with the user entry stored in the data store;
   if the one-time password contained in the request from the credential provisioning module running within the client application on the client device matches the one-time password associated with the user entry stored in the data store, accessing a rules database communicatively connected to the credential provisioning server;
   determining, based on at least one credential provisioning rule from the rules database, whether to proceed with the provisioning of the user account for the client application on the client device;
   if the credential provisioning server determines to proceed with the provisioning of the user account for the client application on the client device based on the at least one credential provisioning rule from the rules database, the credential provisioning server performs:
      generating a key pair using credential parameters associated with the request from the credential provisioning module running within the client application on the client device;
      generating a certificate signing request using the key pair and user information specific to the user;
      communicating the certificate signing request to a certificate authority;
      receiving a signed certificate from the certificate authority;
      encrypting, using an enterprise password provided to the credential provisioning server by the user or using a temporary encryption password generated and provided to the credential provisioning server by the credential provisioning module running within the client application on the client device, the signed certificate received from the certificate authority and the key pair generated by the credential provisioning server; and
      sending the signed certificate file and the key pair that have been encrypted by the credential provisioning server and identifying information of a key store or keychain location on the client device to the credential provisioning module running within the client application on the client device, the client application storing, using the identifying information, the signed certificate and the key pair at the key store or keychain location on the client device to thereby complete the provisioning of the user account for the client application on the client device.

16. The computer program product of claim 15, wherein the client application is operable to:
   prior to storing the signed certificate and the key pair at the key store or keychain location on the client device, decrypt the signed certificate and the key pair using the temporary encryption password or the enterprise password; and
   establish a mutual secure connection with a trusted server over a network using the signed certificate file and the key pair stored at the key store or keychain location on the client device.

17. The computer program product of claim 16, wherein the trusted server operates on a virtual device platform and, once the mutual secure connection is established, the client application is operable to utilize resources of the virtual device platform.

18. The computer program product of claim 15, wherein if the credential provisioning server determines, based on the at least one credential provisioning rule from the rules database, that the provisioning of the user account for the client application is to take place on the client device:
   the credential provisioning server determines a name and email address for the user based on enterprise account information associated with the user;
   the credential provisioning server sends an instruction and credential data to the credential provisioning module running within the client application on the client device, the credential data including the name and email address for the user and identifying information of a key store or keychain location on the client device;
   responsive to the instruction from the credential provisioning server, the credential provisioning module running within the client application on the client device performs:
      generating a pair of keys;
      storing, based on the identifying information, the pair of keys at the key store or keychain location on the client device;
      generating a certificate signing request using the pair of keys and the credential data; and
      communicating the certificate signing request to the credential provisioning server;
   the credential provisioning server verifies the certificate signing request;
   if the certificate signing request is verified by the credential provisioning server, the credential provisioning server sends the certificate signing request from the credential provisioning module running within the client application on the client device to a certificate authority and returns a signed certificate from the certificate authority to the credential provisioning module running within the client application on the client device; and if the certificate signing request is not verified by the credential provisioning server, the provisioning of the user account for the client application is terminated.

19. The computer program product of claim 15, wherein the certificate authority operates internal or external to a secure network within which the credential provisioning server operates.

20. The computer program product of claim 15, wherein the credential provisioning module running within the client application on the client device receives the one-time password for the user via an email, a text message, or a QR code.

* * * * *